(12) United States Patent
Ishikawa et al.

(10) Patent No.: US 6,992,425 B1
(45) Date of Patent: Jan. 31, 2006

(54) DISPLAY APPARATUS WITH A MULTI-LAYER ABSORPTION, CONDUCTION AND PROTECTION FILM

(75) Inventors: Takao Ishikawa, Hitachi (JP); Daigoro Kamoto, Hitachi (JP); Tomoji Oishi, Hitachi (JP); Ken Takahashi, Ibaraki (JP); Norikazu Uchiyama, Chiba (JP); Kiyoshi Miura, Mobara (JP); Masahiro Nishizawa, Mobara (JP); Toshio Tojo, Chiba (JP)

(73) Assignees: Hitachi, Ltd., Tokyo (JP); Hitachi-Device Engineering Co., Ltd., Chiba (JP)

( * ) Notice: Subject to any disclaimer, the term of this patent is extended or adjusted under 35 U.S.C. 154(b) by 0 days.

(21) Appl. No.: 09/413,867

(22) Filed: Oct. 7, 1999

(30) Foreign Application Priority Data

Oct. 7, 1998 (JP) ........................................... 10-285001

(51) Int. Cl.
*G02B 1/10* (2006.01)

(52) U.S. Cl. ...................... 313/110; 313/489; 313/112; 313/461; 313/477 R; 313/478

(58) Field of Classification Search ................ 313/110, 313/112, 479, 461, 474, 478, 477 R, 489; 345/60; 428/212, 216
See application file for complete search history.

(56) References Cited

U.S. PATENT DOCUMENTS

| 5,218,268 A | 6/1993 | Matsuda et al. |
|---|---|---|
| 5,315,209 A | 5/1994 | Iwasaki |
| 5,585,805 A | 12/1996 | Takenaka et al. |
| 5,660,876 A | 8/1997 | Kojima et al. |
| 5,681,885 A | 10/1997 | Kinoshita et al. |
| 5,789,854 A | 8/1998 | Takizawa et al. |
| 5,939,821 A * | 8/1999 | Itou et al. ................... 313/461 |
| 5,942,319 A * | 8/1999 | Oyama et al. .............. 428/216 |
| 6,208,389 B1 * | 3/2001 | Aben et al. ................. 313/479 |

FOREIGN PATENT DOCUMENTS

| EP | 0 533 030 A2 | 3/1993 |
|---|---|---|
| EP | 0 859 398 A1 | 8/1998 |
| EP | 0 940 837 A1 | 9/1999 |
| GB | 2 250 133 A | 5/1992 |
| JP | 3-145043 | 6/1991 |
| WO | WO 94/19709 | 9/1994 |

* cited by examiner

*Primary Examiner*—Nimeshkumar D. Patel
*Assistant Examiner*—Sharlene Leurig
(74) *Attorney, Agent, or Firm*—Antonelli, Terry, Stout & Kraus, LLP

(57) ABSTRACT

A high definition display apparatus having a wavelength selective absorption effect and an anti-static and anti-reflection effect is provided by thin films having a low resistance and a high refractive index. The high definition display apparatus has an anti-static and anti-reflection film composed of laminated oxide or metallic thin films, wherein at least three layers of oxide or metallic films having different reflectance from each other are laminated onto the front surf ace of the display apparatus, and the laminated films are composed such that an absorbing film containing coloring material is arranged under a high reflectance film as seen from the outer surface of the laminated films.

22 Claims, 3 Drawing Sheets

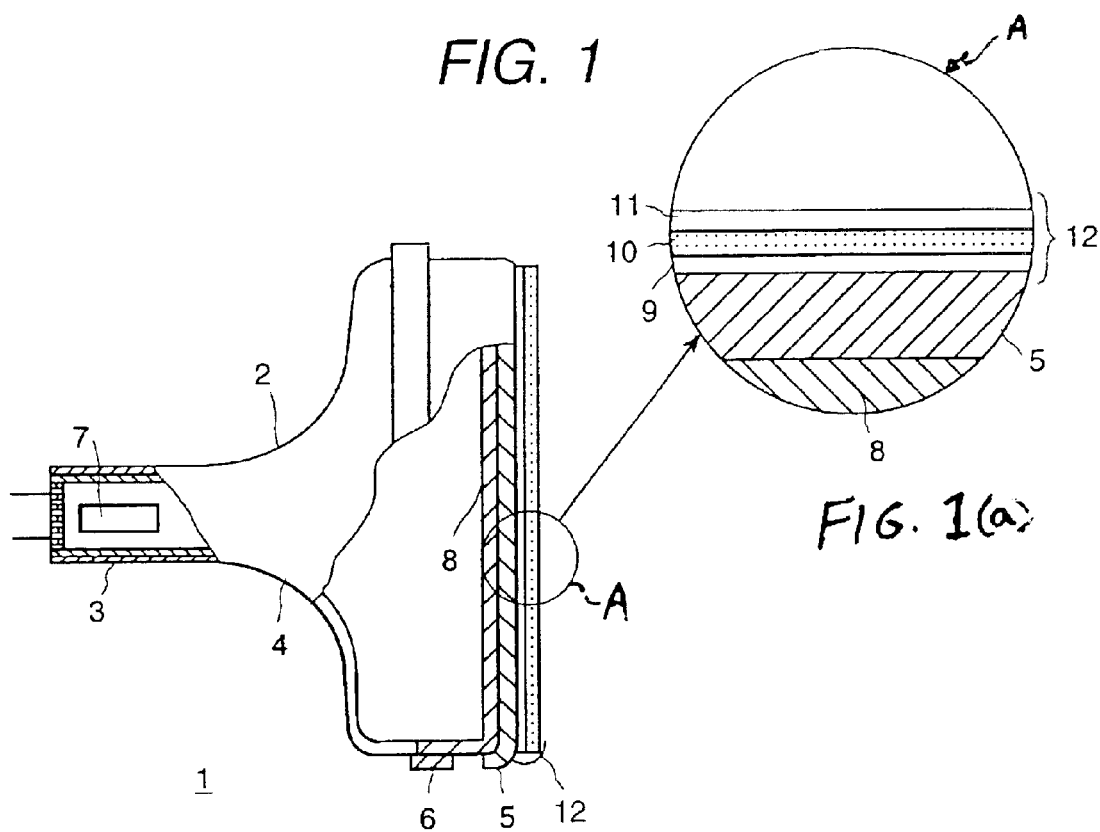
FIG. 1
FIG. 1(a)
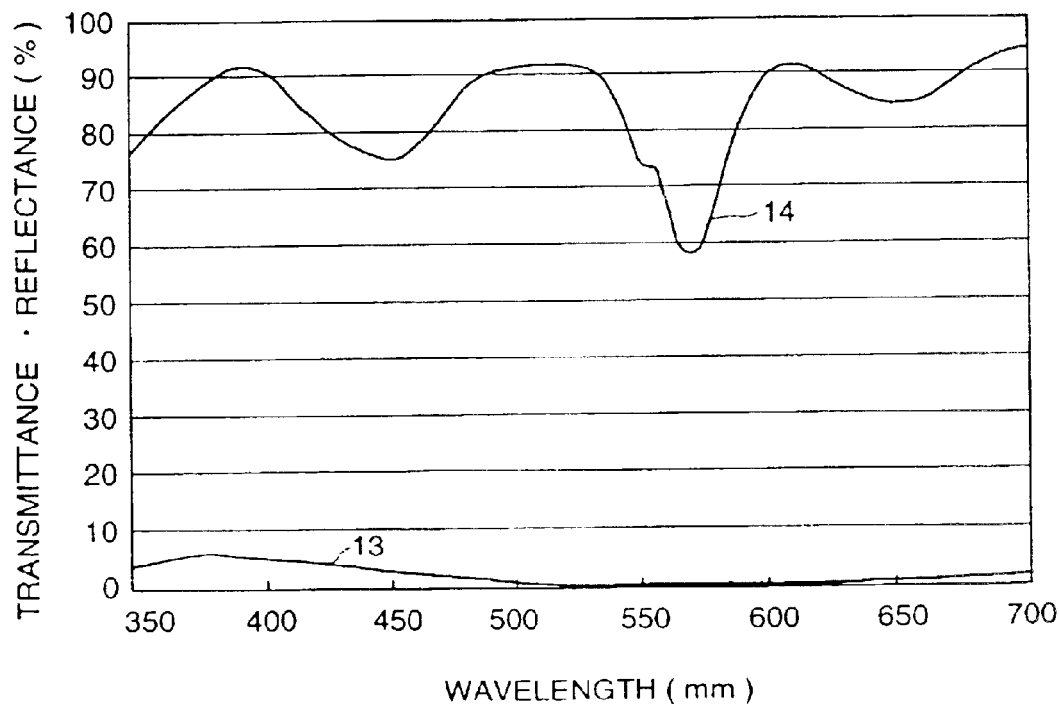
FIG. 2

DISPLAY APPARATUS WITH A MULTI-LAYER ABSORPTION, CONDUCTION AND PROTECTION FILM

BACKGROUND OF THE INVENTION

In order to obtain a display apparatus which is capable of producing a high definition display, various surface treatment films have been formed on the surface of the display plane of the display apparatus. For instance, the use of an anti-static anti-reflection film has been proposed, as disclosed in JP-A-4-334853 (1992). Furthermore, the use of a wavelength selective absorption film, which is capable of absorbing side bands of emission spectrum selectively, by adding coloring material for improving the color purity of an emitter, has been proposed, as disclosed in JP-A-4-144733 (1992), because the emission spectrum of the RGB emission of a Braun tube is wide and the bleeding of colors tend to occur.

One of the anti-static, anti-reflection films is formed by laminating oxide thin films having a different refractive index on each other, in order to give the film an anti-reflection effect by optical interference, and this film is mainly formed by laminating a $SiO_2$ film as an upper layer or an ITO (InO added with Sn) film as a lower layer. Because ITO is a conductive film, the anti-reflection film itself has an anti-static effect needed. Not only the anti-static effect, but also an electromagnetic shielding function is required for the surface treatment film of a Braun tube.

One of the wavelength selective absorption films is formed by adding a reddish violet group coloring material into a thin film, in order to absorb side bands of the emission spectrum of green and red, and a Braun tube having a high contrast has been provided with such a film (Toshiba Review, vol. 45, No. 10, p831 (1990)).

SUMMARY OF THE INVENTION

The present invention relates to a display apparatus, particularly to a surface treating film for a display apparatus, such as a Braun tube, plasma display, and the like, for providing a high definition display apparatus.

However, the prior efforts described above have proven to be insufficient for development of high definition Braun tube. Conventionally, a high definition Braun tube, using a surface treatment film having a low reflection, a low resistance, and a wavelength selective absorption effect, has not been developed, yet. For improving the contrast of a Braun tube, an anti-reflection characteristic is required, wherein the reflectance is controlled by laminating films having a wavelength selectivity by adding coloring material so that the films will have different refractive indexes relative to each other. It is well known that, when a coloring material is added to a material, the refractive index of the material is varied in the absorption wavelength region of the coloring material. When anti-reflection is realized by an optical interference effect, the optical interference effect is undesirably influenced, because the refractive index is varied by an abnormal dispersion of the refractive index of the coloring material. Therefore, the refractive index curve does not become flat, but exhibits a waviness and an abnormal region to increase the refractive index and so on, and, as a result, the performance as an anti-reflection film is deteriorated.

In consideration of a variation in reflectance when the coloring material is added, when coloring materials of red, blue, and green are added, the refractive index is changed in respective ones of the absorption regions, such as by its increasing first in accordance with a decreasing of the wavelength, and subsequently decreasing. Therefore, a relationship between the refractive indexes of the upper layer and that of the lower layer are inverted relative to each other, and so the control of the refractive indexes becomes difficult. When a coloring material is added to the laminated films, the refractive index curve is varied depending on whether the coloring material is added to the upper layer or the lower layer. Accordingly, the reflectance can be decreased in a specified region by using a change of refractive index of the coloring material, but in the region wherein the refractive index is inverted, the refractive index is increased because the refractive indexes of the films of the upper layer and the lower layer are inverted relative to each other.

However, as a result, the refractive index of the film is decreased so as to be smaller than the high refractive index of the original oxide film due to the addition of the coloring material, because the refractive index of the oxide and the refractive index of the coloring material are averaged. Accordingly, with regard to the reflectance curve, the value at the bottom is increased, because the difference between the refractive indexes of the upper and lower layers is decreased.

Furthermore, a low resistance film is necessary for a Braun tube, because the functions of anti-static and electromagnetic shielding are required for a Braun tube. ITO is used most widely at present. However, if a coloring material is added, the resistance of the ITO is increased. The resistance tends to increase in opposition to the requirement for a low resistance, because the concentration of the coloring material tends to increase in order to enhance the wavelength selective absorption effect.

The object of the present invention is to provide a display apparatus using a surface treatment film having a low reflection, low resistance, and a wavelength selective absorption effect.

In order to achieve the foregoing object, the present invention provides a display apparatus with a surface treatment film having a luminous transmittance equal to or less than 85%, a luminous reflectance equal to or less than 2%, and a flattened reflectance curve, in which absolute values of differential values are equal to or less than 2. Furthermore, the present invention is characterized in that the surface treatment film has a selective absorption at approximately 450 nm, 570 nm, and 650 nm, and a sheet resistance equal to or less than 10000 Ω/□.

A high definition display apparatus having a wavelength selective absorption anti-reflective anti-static film, according to the present invention, comprises a film laminated with at least three film layers, including a protective film, a conductive film, and an absorption film, on the surface of the display plane, and the laminated film is composed such that the conductive film is arranged at a position closer to the surface of the display plane than the absorption film which contains coloring material. The laminated film has a luminous transmittance equal to or less than 85%, a luminous reflectance equal to or less than 2%, a flattened reflectance curve, and a resistance equal to or less than 10000 Ω/□. The conductive film is composed of at least one metal selected from the group consisting of Ag, Pd, Pt, Cu, Cr, and Au. Furthermore, any one of ATO ($SnO_2$ added with antimony) and ITO, which are conductive oxides, can be used. The absorption film containing coloring material is composed of at least one of dyes and pigments selected from the group consisting of dyes and pigments having an absorption at 450 nm, dyes and pigments having an absorption at 570 nm, and dyes and pigments having an absorption at 650 nm.

A high definition display apparatus having a wavelength selective absorption anti-reflective, anti-static film, according to the-present invention, comprises a film laminated with film layers, including a protective film, a conductive film, and an absorption film, on a surface of the display plane; the laminated film is formed such that a first layer from the surface of the display plane is the protective film made of mainly $SiO_2$, a second layer is the conductive film composed of at least one metal selected from the group consisting of Ag, Pd, Pt, Cu, and Cr, and a third layer is the absorption film containing coloring material; and, the laminated film has a luminous transmittance equal to or less than 85%, a luminous reflectance equal to or less than 2%, a flattened reflectance curve, and a resistance equal to or less than 10000 $\Omega/\square$. Furthermore, the laminated film has an absorption equal to or less than 75% at approximately 450 nm, an absorption equal to or less than 65% at approximately 570 nm, and an absorption equal to or less than 75% at approximately 650 nm; and, it has a luminous reflectance equal to or less than 1%, a flattened reflectance curve, and a resistance equal to or less than 10000 $\Omega/\square$.

In accordance with the present invention, a wavelength selective absorption anti-reflective, anti-static film is utilized for a display apparatus, such as a Braun tube, plasma display panel and so on.

The protective film is made of mainly $SiO_2$, and serves to maintain the strength of the laminated surface treatment film. The conductive film is made of metal or a conductive oxide for anti-static and electromagnetic shielding. Reflection is prevented by the two layers which form the protective film and the conductive film. The absorption film contains a coloring material, and its function is to absorb a wavelength selectively.

When coloring material is added, the refractive index of the film is varied depending on the absorption of the wavelength by the coloring material. Therefore, if reflection is prevented by an interference effect of light, the interference effect of light is influenced by a variation of the refractive index. It is difficult to flatten the reflectance curve by decreasing the variation of the refractive index. In particular, if a large amount of the coloring material is added in order to increase the wavelength selective absorption effect, the variation of the refractive index in the absorption region becomes remarkable.

The reflectance of the anti-reflection film is expressed as a luminous reflectance, which is an area of the curve obtained by multiplying the reflectance of the film in a visible light region of 380 nm–780 nm with the luminous sensitivities of the respective wavelengths. The luminous sensitivity is 1.0 at 555 nm. The luminous sensitivity is decreased as the wavelength becomes more distant from 555 nm, which is regarded as a standard, on both sides, and the luminous sensitivity becomes zero at 380 nm and 780 nm.

Because the luminous reflectance is a product of the luminous sensitivity and the reflectance curve, the value thereof at 555 nm is small, and it becomes small only if the reflectance curve is flat, and not a U-shaped curve, but approximately a straight line. If a change of the refractive index is increased by addition of a coloring material, the reflectance curve does not become flat, and the luminous reflectance can not be decreased. In particular, when a red group coloring material is added, its absorption wavelength is in the range of 540–590 nm having a high luminous sensitivity, and the influence of the change in the refractive index on the luminous reflectance is remarkable.

As explained above, it is difficult to decrease the luminous reflectance by forming the wavelength selective absorption anti-reflection film by adding a coloring material thereto. Therefore, in order to form an anti-reflection film having wavelength selective absorption characteristics by adding coloring material, the composition of the present invention is necessary.

The anti-reflection characteristics can be obtained by utilizing the interference effect of light generated by laminating films having different refractive indexes on each other. As the number of laminated layers is increased, the intensity of the light is decreased as the position of the film comes close to the bottom. Therefore, the reflectance curve can be flattened by arranging the film to which coloring material is added at the lowest position in the layers as is possible, because the contribution of the film with the added coloring material to the anti-reflection can be decreased.

Furthermore, reflection of extraneous light can be increased by using a film having a high reflectance, such as a metallic film. Accordingly, if a metallic film is arranged at a position higher than the film with the added coloring material, the intensity of extraneous light which reaches the film with the added coloring material is decreased. As a result, the contribution of the film to the anti-reflection effect can be decreased, and both the effects of wavelength selective absorption and anti-reflection can be obtained with a small number of laminated layers.

Here, the number of laminated layers means at least three laminated layers. In view of manufacturing requirements, the number of laminated layers desirably should be as small as possible. Manufacturing the wavelength selective absorption anti-reflection film with as small a number of laminated layers as possible can be achieved by using a film having an extremely large refractive index.

The film to which coloring material is added produces a change in refractive index in the absorption wavelength region and a decrease in the anti-reflection effect. However, when the film with added coloring material is arranged at a position lower than a high reflection layer, the intensity of the reflected light at the boundary of the film with added coloring material is decreased remarkably, and the contribution to the interference of light can be decreased. Thus, in accordance with the present invention, a metallic film such as Ag, Pd, Pt, Cr, Cu, and Au was used as the high reflection film. The metallic film has a small resistance and operates as an electromagnetic shielding film. The reflectance is large, the intensity of extraneous light which reaches a film lower than the metallic film is small, and it is scarcely necessary to worry about the light resistance of the coloring material for the wavelength selective absorption film.

Generally, coloring material is decomposed by ultraviolet rays, and the light resistance thereof is weak. Conventionally, pigment group coloring materials having a strong light resistance as a coloring material, but undesirable absorption characteristics, have been used as the coloring material. However, in accordance with the composition of the present invention, dye group coloring materials having desirable absorption characteristics, but weak light resistance, can be used, with the result that a high performance display apparatus having preferable wavelength selective absorption characteristics can be manufactured.

BRIEF DESCRIPTION OF THE DRAWINGS

FIG. 1 is a partial cutaway side view of a Braun tube relating to an embodiment of the present invention;

FIG. 1(a) is a sectional view of the area A in FIG. 1;

FIG. 2 is a graph of observed results of reflectance and transmittance in a Braun tube relating to the embodiment of the present invention;

Figure 3:
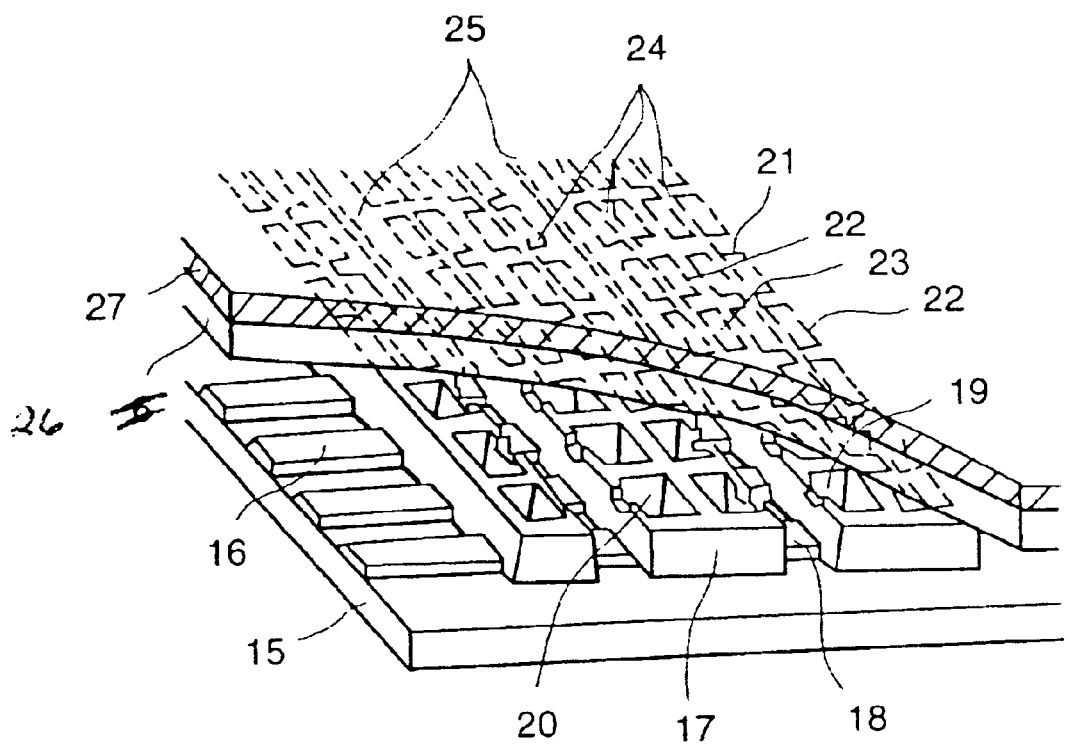
FIG. 3 is a partial cutaway perspective view of the plasma display relating to the embodiment of the present invention.

PREFERRED EMBODIMENTS OF THE PRESENT INVENTION (Embodiment 1)

As an embodiment of the present invention, an example of a Braun tube representing the display apparatus of the invention will be explained.

FIG. 1 is a partially cutaway side view illustrating a Braun tube 1 representing an embodiment of the present invention. FIG. 2 is a graph indicating an observed result relating to the relationship between each of a reflectance (indicated by the curve 13 in the figure) and a transmittance (indicated by the curve 14 in the figure) of the surface treatment film of the Braun tube with respect to the wavelength of light in the present embodiment.

The high definition Braun tube 1 comprises a housing 2 made of glass, of which the interior is evacuated. The housing 2 comprises a neck 3, a funnel portion 4 which continues from the neck 3, and a face plate 5 sealed by frit glass. The outer peripheral side-wall of the face plate 5 has a metallic tension band 6 wound thereon for anti-explosion. An electron gun 7 for discharging an electron beam is arranged in the neck 3. A plurality of fluorescent members (generally fluorescent layers of three colors such as red, green, and blue phosphors applied in a dotted pattern or a stripe pattern) and a fluorescent screen 8, which is composed of black absorbing layers in a dotted pattern or a stripe pattern arranged between each of the fluorescent layers, are provided at an inner surface of the face plate 5.

A CRT display apparatus (a cathode ray tube display apparatus) is formed by connecting the Braun tube 1 to display control circuits, such as horizontal and vertical deflection circuits, power source circuits, and the like. That is, in accordance with the typical cathode ray tube display apparatus, the scanning of electron beams, which are accelerated by the cathode voltage of the electron gun 7 of the cathode ray tube, is performed by supplying a sawtooth current at horizontal cycles and a sawtooth current at vertical cycles, respectively, to coils arranged in the vicinity of the path of the electron beams, from each of horizontal and vertical deflection circuits, and image displaying is performed by scanning the electron beam in a raster. The scanning lines traced by the accelerated electron beams are projected on a luminescent screen 8 via a shadow mask, which is not illustrated in the figure.

One of the feature of the present embodiment is that a wavelength selective absorption anti-reflective, anti-static film 12 is provided on an outer surface of the face plate 5 of the Braun tube 1, the details of which are illustrated in FIG. 1(a).

A method of preparing the wavelength selective absorption anti-reflective, anti-static film 12 will be explained by way of example. A coating solution, which was prepared by adding a rhodamine group coloring material, serving as a reddish violet group coloring material, Cu phthalocyanine, serving as a blue group coloring material, and a yellow group coloring material to silica sol, was coated onto the surface of the Braun tube by spin coating at 160 rpm, and the resulting solution was dried at 60° C. for 5 minutes to form a $SiO_2$ film 9 containing a coloring material on the face plate 5.

The composition of this solution was as follows:

$SiO_2$: 2 wt. %, sulforhodamine B: 0.05 wt. %, Cu phthalocyanine: 0.06 wt. %, ethanol: 20 wt. %, sodium fluoresein: 0.02 wt. %, water: 10 wt. %, and propanol: residual.

Then, a fine particle Ag—Pd dispersion liquid was applied by a spin coating method at 160 rpm and dried at 60° C. for 5 minutes, to laminate an Ag—Pd film 10 onto the $SiO_2$ film 9 containing a coloring material. Finally, silica sol was applied by a spin coating method at 160 rpm and dried at 60° C. for 5 minutes, to form a $SiO_2$ film 11.

Subsequently, the formation of the wavelength selective absorption anti-reflective, anti-static film 12 was completed on the face plate 5 by heating the laminated films to 160 C with a velocity of 20 C/min., heat-treating them at 160 C for 15 minutes, and cooling them to room temperature with a velocity of 20° C./min.

As a result, the surface resistance of the manufactured wavelength selective absorption anti-reflective, anti-static film 12 was 350 $\Omega/\square$ and the transmittance and the reflectance were as indicated by the curve 13 and the curve 14, respectively, in FIG. 2. A selective absorption film having a transmittance of 75% at 450 nm, 59% at 570 nm, and 85% at 650 nm, was obtained. The luminous transmittance of the film was approximately 85%. A Braun tube having a reflectance of 5.8% at maximum in the visible light region, 0.36% at minimum with 555 nm, and a flat reflecting characteristic was manufactured. The luminous reflectance of the film was 0.85%. Absolute values of the calculated differentials of the reflectance curve were equal to or less than 2. As explained above, the reflectance could be flattened, even if the wavelength selective absorption effect was added by adding coloring material.

The differential of the reflectance is represented by the slope of the reflectance curve 14 in FIG. 2, but the differential of the reflectance can also be obtained by differentiating the reflectance obtained by a spectrophotometer or by using a differentiating program of the spectrophotometer (U3500 made by Hitachi, Ltd.). The width of the differentiation is in the range of 1 nm–50 nm, preferably in the range of 1 nm–5 nm.

Here, surface treatment films having various concentrations of the coloring material in the film were prepared, and their contrast was calculated based on their RGB emission spectrum intensity and transmittance. It was revealed that the desired effect could be obtained if the luminous transmittance was in the range of 40–85%. Thus, it was decided that the luminous transmittance should be in the range of 40–85%. However, if the luminous transmittance is in the range of 40–50%, the brightness is decreased. Therefore, a range of 50–85% is more desirable.

Then, films having a different transmittance with respect to each other were prepared by varying the concentration of the coloring material added to the absorption film, and their contrasts were calculated in the same manner as before. It was revealed that the contrast was improved when the transmittance at 450 nm, 570 nm, and 650 nm was in the range of 85–40%, 65–35%, and 90–45%, respectively. However, when the values at 450 nm and 650 nm were at least 75%, and the value at 570 nm was at least 40%, the blackness of the film was diminished, and it became difficult to maintain the color balance. The transmittance of the coloring material at each of 450 nm, 570 nm, and 650 nm should be desirably in the range of 85–40%, 65–35%, and 90–45%, respectively, but preferably it is in the range of 75–40%, 65–40%, and 75–45% at 450 nm, 570 nm, and 650 nm, respectively.

Films having a different thickness with respect to each other to form the protective film, conductive film, and absorption film were prepared. It was revealed that, if a protective film, i.e. the $SiO_2$ film, having a thickness equal to or less than 150 nm, a conductive film having a thickness equal to or less than 50 nm, and an absorption film having a thickness equal to or less than 1200 nm were combined, the luminous reflectance became equal to or less than 1%. However, the strength of the protective film is decreased when the film thickness is equal to or less than 40 nm, the resistance of the conductive film is increased when the film thickness is equal to or less than 20 nm, and a decrease of the film strength and bleeding of the coloring material of the absorption film is generated, because the concentration of the coloring material is increased in order to obtain the designated transmittance when the film thickness is equal to or less than 300 nm. Accordingly, the protective film is desirably in the range of 150–40 nm, the conductive film is desirably in the range of 20–50 nm, and the absorption film is desirably in the range of 300–1200 nm.

An alloy of Ag—Pd was used for forming the conductive film. Conductive films having various ratios of Ag—Pd were prepared. The surface resistance of the film was scarcely changed depending on the ratio of Ag—Pd, but a difference in chemical resistance was generated depending on the ratio of Ag—Pd. It was revealed that, if the ratio of Ag—Pd was in the range of 6:4–9:1, the film was resistive against any of various acids and bases, such as HCl and $NH_1OH$. In some cases, an anti-chemical property of a Braun tube surface becomes a problem depending on the environment in which it is used or the cleaning operation employed. Generally, the cleaning operation is performed using water and a neutral cleaner, and the environment is in offices or the like. However, in some cases, acidic or alkaline cleaners are used in the cleaning operation, or the Braun tube is used in a laboratory where various chemicals are used. The surface treatment film of the present embodiment could be a film which is not restricted to any environment, nor deteriorated by any cleaners.

The kind of the coloring material which is used is not restricted to the above-described materials, but any of various dyes and pigments, which have an absorption at the wavelength corresponding to any one of reddish violet, blue, and yellow, can be used. Similar results could be obtained by using any conductive film made of Ag, Pd, Cu, Pt, Cr, or Au, in addition to Ag—Pd.

Furthermore, the surface treatment film, such as that described above, can be applied to other types of display apparatus, for instance, a plasma display device. The high definition plasma display device manufactured in accordance with the present invention has a structure such as illustrated in FIG. 3. Negative electrodes 16 are formed on a back plane plate 15, and display cells 20 composed of barriers 17, auxiliary cells 18, and priming spaces 19 are formed thereon. The display cells are coated with fluorescent materials 21, 22, 23 corresponding to respective RGB colors. Positive electrodes 24 and auxiliary electrodes 25 are formed on an upper layer and are sealed with a front plane plate 26. A surface treatment film 27 is formed on the front plane plate 26. The composition of the surface treatment film was the same as that of the Braun tube illustrated in FIG. 1.

The manufactured high definition plasma display device was superior in selective absorption characteristics and reflection preventing characteristics, and had an improved visibility. As described above, it was revealed that the surface treatment film of the present invention could be applied to a display apparatus other than a Braun tube.

(Embodiment 2)

Figure 4:
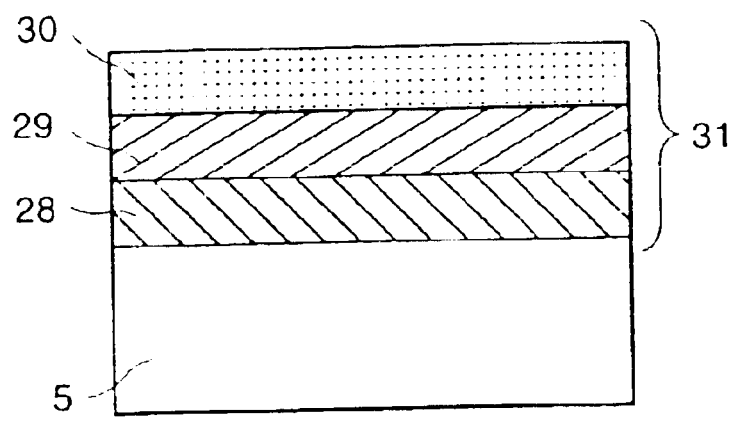
FIG. 4 is a cross section indicating the composition of the surface treatment film relating to the embodiment of the present invention.

Next, a film was manufactured, wherein an organic resin was added to the $SiO_2$ film containing coloring material at the lowest layer, as illustrated in FIG. 4. The method of manufacturing the film will be explained by way of example.

The $SiO_2$ film 28 containing resin and coloring material was formed on a face plate 5 by spin-coating a coating solution, prepared by adding acrylic resin and the coloring material into silica sol, onto a surface of a Braun tube at 160 rpm, followed by drying at 60° C. for 5 minutes. Then, a Ag—Pd film 29 was laminated onto the $SiO_2$ film 28 containing resin and coloring material by applying a Ag—Pd fine particles dispersion solution onto the $SiO_2$ film and spin coating at 160 rpm, followed by drying at 60° C. for 5 minutes. Finally, a $SiO_2$ film 30 was formed on the Ag—Pd film 29 by spin coating a SiO film onto the Ag-Pd film 29 at 160 rpm, and drying the film at 60 C for 5 minutes.

The composition of the solution prepared by adding resin and coloring material was as follows:

$SiO_2$: 2 wt. %, rhodamine B: 0.05 wt. %, ethanol: 20 wt. %, Cu phthalocyanine: 0.06 wt. %, water: 10 wt. %, sodium fluorescein: 0.02 wt. %, acrylic resin: 1 wt. %, and propanol: residual.

Then, the formation of a wavelength selective absorption anti-reflective, anti-static film 31 was completed on the face plate 5 by heating the laminated film to 160° C. with a velocity of 20° C./min., heat-treating the film at 160° C. for 15 minutes, and cooling the film to room temperature with a velocity of 20° C./min.

(Embodiment 3)

Figure 5:
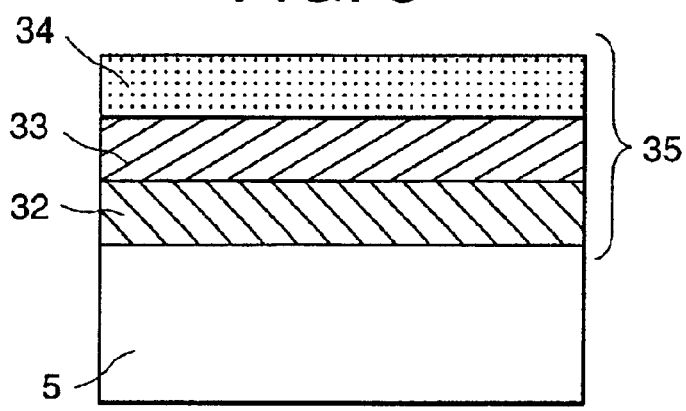
FIG. 5 is a cross section indicating the composition of the surface treatment film relating to the embodiment of the present invention.

Next, a film was manufactured, wherein ATO fine particles were added to the $SiO_2$ film containing coloring material at the lowest layer, as illustrated in FIG. 5. The method of manufacturing the film will be explained by way of example.

The $SiO_2$ film 32 containing ATO and a coloring material was formed on a face plate 5 by spin-coating a coating solution, prepared by adding ATO fine particles and the coloring material into silica sol, onto a surface of a Braun tube at 160 rpm, and then drying the solution at 60° C. for 5 minutes. Then, a Ag—Pd film 33 was laminated onto the $SiO_2$ film 32 containing ATO and coloring material by applying a Ag-Pd fine particles dispersion solution onto the $SiO_2$ film performing spin coating at 160 rpm, and drying the film at 60 C for 5 minutes. Finally, a SiO film 34 was formed on the Ag—Pd film 33 by spin coating a $SiO_2$ film onto the Ag—Pd film 33 at 160 rpm, and drying the film at 60 C for 5 minutes.

The composition of the solution prepared by adding resin and coloring material was as follows:

$SiO_2$: 2 wt. %, rhodamine B: 0.05 wt. %, ethanol: 20 wt. %, Cu phthalocyanine: 0.06 wt. %, water: 10 wt. %, sodium fluorescein: 0.02 wt. %, ATO fine particles: 2 wt. %, and propanol: residual. The ATO used was a commercially available one, and ASR-4 made by Sumitomo Osaka Cement co. was used.

Then, the formation of a wavelength selective absorption anti-reflective, anti-static film 35 was completed on the face plate 5 by heating the laminated film to 160° C. with a velocity of 20° C./min., heat-treating it at 160° C. for 15 minutes, and cooling it to room temperature with a velocity of 20° C./min.

Comparative example 1

Figure 6:
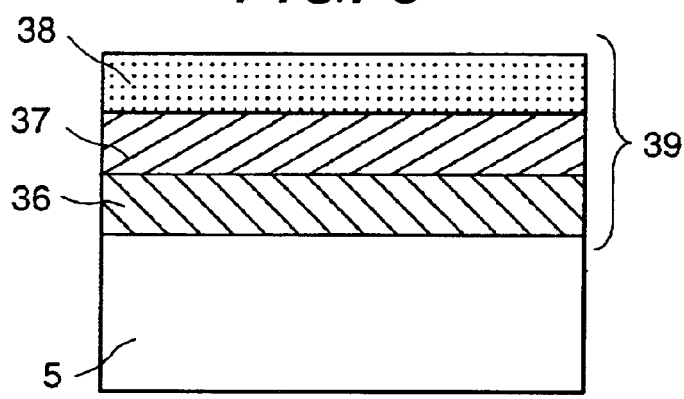
FIG. 6 is a cross section indicating the composition of the surface treatment film relating to the comparative example of the present invention.

For comparison, a film was manufactured, wherein a coloring material was added to the SiO$_2$ film at the uppermost layer, as illustrated in FIG. 6. The method of manufacturing the film will be explained by way of example.

The SiO$_2$ film 36 was formed on a face plate 5 by spin-coating a silica sol coating solution onto a surface of a Braun tube at 160 rpm, and then drying it at 60° C. for 5 minutes. Then, a Ag—Pd film 37 was laminated onto the SiO$_2$ film 36 by applying a Ag—Pd fine particles dispersion solution onto the SiO$_2$ film spin coating at 160 rpm, and drying it at 60 C for 5 minutes. Finally, a SiO$_2$ film 38 was formed on the Ag—Pd film 37 by spin coating a SiO$_2$ solution to which a coloring material was added onto the Ag-Pd film 37 at 160 rpm, and then drying it at 60° C. for 5 minutes.

The composition of the SiO$_2$ solution with added coloring material was as follows:

SiO$_2$: 2 wt. %, rhodamine B: 0.05 wt. %, ethanol: 20 wt. %, Cu phthalocyanine: 0.06 wt. %, water: 10 wt. %, sodium fluorescein: 0.02 wt. %, and propanol: residual.

Then, the formation of a wavelength selective absorption anti-reflective anti-static film 39 was completed on the face plate 5 by heating the laminated film to 160° C. with a velocity of 20° C./min., heat-treating it at 160° C. for 15 minutes, and cooling it to room temperature with a velocity of 20° C./min.

Comparative example 2

Figure 7:
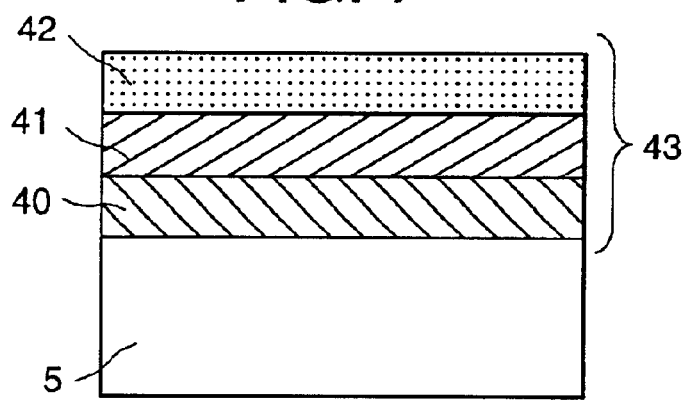
FIG. 7 is a cross section indicating the composition of the surface treatment film relating to the comparative example of the present invention.

Furthermore, for comparison, a film was manufactured, wherein a coloring material was added into the Ag—Pd film, as illustrated in FIG. 7. The method of manufacturing the film will be explained by way of example.

A SiO$_2$ film 40 was formed on a face plate 5 by spin-coating a silica sol coating solution onto surface of a Braun tube at 160 rpm, and then drying the film at 60° C. for 5 minutes. Then, a Ag—Pd film 41 was laminated onto the SiO$_2$ film 40 by applying a Ag—Pd fine particles dispersion solution with a coloring material onto the SiO$_2$ film spin coating at 160 rpm, and then drying the film at 60° C. for 5 minutes. Finally, a SiO film 42 was formed on the Ag—Pd film 41 by spin coating a SiO$_2$ film onto the Ag—Pd film 41 at 160 rpm, and then drying the film at 60 C for 5 minutes.

The composition of the solution prepared by adding resin and coloring material was as follows:

Ag—Pd fine particles: 1 wt. %, rhodamine B: 0.05 wt. %, ethanol: 20 wt. %, Cu phthalocyanine: 0.06 wt. %, water: 10 wt. %, sodium fluorescein: 0.02 wt. %, and propanol: residual.

Then, the formation of a wavelength selective absorption anti-reflective anti-static film 43 was completed on the face plate 5 by heating the laminated film to 160° C. with a velocity of 20° C./min., heat-treating it at 160° C. for 15 minutes, and cooling it to room temperature with a velocity of 20° C./min.

The performance of the Braun tube surface treatment films prepared in accordance with the various embodiments was evaluated. The performance evaluation was performed on transmittance, reflectance, surface resistance, strength, light resistance, and the amount of bleeding. Hereinafter, each of the performance evaluating methods will be briefly explained.

The surface resistance was measured by a simplified surface ohm-meter (made by Nihon Yuka Co.) using a 4-pin probe or a 2-pin probe. The reflectance and the transmittance were measured by a spectrophotometer (u3500 made by Hitachi Ltd.) using an integrating sphere for eliminating any influence by random reflection. The film quality (surface roughness) was measured by a gross-meter (made by Horiba Seisakusyo Ltd.), and it was confirmed that the film quality of any one of the films was at least a gross value 98, and the influence of the random reflection was scarce. However, in some cases, the reflectance was deemed to be high owing to some influence of the random reflection. Therefore, the reflectance was measured exactly using the integrating sphere measuring system.

The film strength was measured by a eraser test. The film was rubbed with an eraser (5030 made by Lion Co.) with a load of 1 kg, and the strength was determined as the number of rubbing operations until the gross change of the film became at least 10%.

The light resistance was determined by measuring a change in transmittance at 570 nm after irradiating the film with ultraviolet rays (360 nm) of 4 mW/cm$^2$ for 300 hours.

The amount of bleeding was evaluated as a change in transmittance after forming the laminated layers, taking the single layer of the film containing the coloring material as a standard. The transmittance at 570 nm after lamination becomes somewhat smaller than that of the single layer of the film containing the coloring material owing to the Ag—Pd film. Therefore, the measurement was performed on the single layer of the film containing the coloring material having the Ag—Pd film at its lower layer, and it was taken as the standard. The amount of bleeding ΔT was calculated by the following equation.

ΔT={(transmittance at 570 nm after lamination)−(transmittance at 570 nm of the single layer of the film containing the coloring material)}/(transmittance at 570 nm of the single layer of the film containing the coloring material)

The results of the performance evaluation of respective surface treatment films prepared as described above are indicated in Table 1.

TABLE 1

| | Surface resistance (Ω/□) | Transmittance (%) | | | Luminous transmittance |
|---|---|---|---|---|---|
| | | 450 nm | 570 nm | 650 nm | |
| Emb-1) | 350 | 75 | 59 | 85 | 85 |
| Emb-2 | 350 | 67 | 47 | 72 | 72 |
| Emb-3 | 350 | 67 | 47 | 72 | 72 |
| Com-1[2]) | 4200 | 65 | 48 | 71 | 86 |
| Com-2 | 8000000 | 82 | 78 | 89 | 86 |

| | Reflectance (%) | | Eraser test | Light resistance Δt | Amount of bleeding ΔT |
|---|---|---|---|---|---|
| | 555 nm | luminous reflectance | | | |
| Emb-1) | 0.36 | 0.85 | 150 | 5 | 20 |
| Emb-2 | 0.32 | 0.68 | 200 | 5 | 1 |
| Emb-3 | 0.35 | 0.78 | 200 | 2 | 1 |
| Com-1[2]) | 2.3 | 3.8 | 50 | 50 | 0 |
| Com-2 | 2.8 | 3.7 | 50 | 28 | 62 |

In the embodiments 1–3, the reflectance was less than 1%, even if the transmittance was small. The differentials were less than 2, and flat reflectance curves were obtained. On the other hand, in the comparative examples 1–2, the transmittance was small, but the reflectance was larger than 2%, the differentials were larger than 3, and the reflectance curves were not flat. The anti-reflection characteristics could not be obtained. In accordance with these results, it is seen that the reflectance curve becomes flat by arranging the coloring material layer under the metallic film, such as the Ag—Pd film, and the anti-reflection characteristics can be made preferable.

It is also seen from the results indicated in Table 1 that the light resistance can be made preferable by arranging the coloring material layer under the metallic film. The metallic film has a high reflectance, and reflects incident light significantly at a boundary plane of the metallic film. Accordingly, transmittance of the incident light to the film at a lower layer than the metallic film is decreased, and the effect on the reflectance and deterioration of the coloring material by irradiation of ultraviolet rays can be suppressed. The light resistance is increased further if ATO fine particles are mixed into the coloring material layer, as indicated by the embodiment 3. This is because the ATO fine particles absorb ultraviolet rays, and the light resistance can be improved by not only ATO, but also any material which is transparent and absorbs ultraviolet rays. For instance, ZnO, ITO, TiO, carbon, and the like are materials corresponding to the above material. Their effects could be: confirmed by forming films by actual mixing of these materials. However, as carbon is not transparent, its content must be suppressed as much as possible so to not affect the transmittance of the material.

In accordance with the embodiments 2 and 3, the film strength is increased more than that of the embodiment 1, and the amounts of bleeding are decreased. In a case in which an organic resin is added, the film becomes dense even in a dried condition, and the amount of bleeding is decreased. When treated at 160° C., the adhesion force of the film is increased, because the resin is a thermosetting resin, and, as a result, the strength of the film is increased. In accordance with the embodiment 1, the $SiO_2$ film and the Ag—Pd film are adhered to each other, but the metal and the $SiO_2$ film do not have a desirable wettability to each other, so that contact failure will readily occur. On the other hand, in accordance with the embodiment 2, wherein an organic resin is added, contact failure can be prevented, because a resin which is used for adhesion of metal and glass is added. A resin, such as an acrylic resin, epoxy resin, phenolic resin, and the like, could be used for the resin, and their advantages can be confirmed by actual preparation of the film.

In accordance with the embodiment 2, wherein ATO was added, bleeding of colors was prevented by adsorbing the coloring material with fine particles of the oxide.

Furthermore, with the addition of fine particles, one is apt to assure that the film strength is decreased, but actually, advantages as a filler are generated by optimizing the size and additive amount of the fine particles, and the film strength can be improved by reducing the internal stress of the film and preventing crack generation.

As explained above, wavelength selective absorption characteristics can be added without lowering the reflection preventing characteristics by arranging the coloring material layer under the metallic film. And, it was revealed that the mechanical strength of the film could be improved by adding an organic resin and fine particles to the coloring material layer. Furthermore, it was revealed that deterioration of the coloring material by ultraviolet rays could be prevented by arranging the coloring material under the metallic film, because the external light then reaches the coloring material after being weakened by the metallic film.

Conventionally, if a material having no light resistance such as dyes was used with a high concentration, the material tended to become deteriorated by irradiation of ultraviolet rays from fluorescent light. Therefore, it was difficult to use such dyes, and the only remaining option was to use pigments. However, the pigments had an absorption peak broader than that of the dyes, and the wavelength selective absorption characteristics were somewhat worse than that of the dyes. In accordance with the result of the present embodiment, in which the light resistance could be improved, use of the dyes was made possible instead of the pigments which had been used widely, and it was found that the wavelength selective absorption characteristics could be improved. Therefore, it was revealed that Braun tubes having an enhanced high contrast could be manufactured.

The above embodiments have referred to the use of a film having a three layered structure, but a surface treatment film having a four-layered structure, or more layers, can be used within the scope of the present invention. In such case, another film can be arranged between the high reflectance layer and the absorption film. In some cases, another film can be arranged between the coloring material layer and the display plane.

As explained above, in a high definition display apparatus having an anti-static and anti-reflection film formed by laminating oxide or metallic thin films, at least three layers of oxide or metallic films having a different reflectance from each other are laminated on the surface of the display device, and the laminated film is formed so that an absorption film containing coloring material is arranged at a layer lower than the high reflectance film, as seen from the surface of the display device. Owing to use of a thin film of low resistance and high refractive index, as explained above, the surface treatment film having a wavelength selective absorption effect and an anti-static and an anti-reflection effect, and a luminous reflectance equal to or less than 2%, can be formed, and a high definition display apparatus having a high contrast and good safety, which can shield leakage electromagnetic waves, can be provided.

In accordance with the present invention, a high definition display apparatus having a high contrast and good safety, which can shield leakage electromagnetic waves, can be provided.

What is claimed is:

1. A display apparatus comprising a film on a display plane, wherein said film has:
   a luminous transmittance equal to or less than 85%,
   a luminous reflectance equal to or less than 2%, and
   a flattened reflectance curve, of which all absolute values of differential values in a visible light region of 380 nm–780 nm are equal to or less than 2.

2. A display apparatus as claimed in claim 1, wherein said film has:
   said selective absorption with absorption Peaks at approximately 450 nm, 570 nm, and 650 nm, and a resistance equal to or less than 10000 Ω/□.

3. A display apparatus as claimed in claim 1, wherein said film is provided on an outer surface of said display plane.

4. A display apparatus comprising:
   a laminated film composed of at least three layers comprising a protective film, a conductive film, and an absorption film at a surface of a display plane;
   wherein said laminated film is constituted so that said absorption film contains coloring matter and is arranged at a position closer to said display plane than said conductive film;

wherein said laminated film has a luminous transmittance equal to or less than 85%, a luminous reflectance equal to or less than 2%, a flattened reflectance curve, of which absolute values of differential values are equal to or less than 2, and a resistance equal to or less than 10000 Ω/□.

5. A display apparatus as claimed in claim 4, wherein said conductive film is composed of at least one metal selected from the group consisting of Ag, Pd, Pt, Cu, Cr, and Au.

6. A display apparatus as claimed in claim 4, wherein said coloring matter contained in said absorption film is composed of at least one of dyes and pigments selected from the group consisting of dyes and pigments having an absorption at 450 nm, dyes and pigments having an absorption at 570 nm, and dyes and pigments having an absorption at 650 nm.

7. A display apparatus as claimed in claim 4, wherein said laminated film is provided on an outer surface of said display plane.

8. A display apparatus as claimed in claim 4, wherein all of said absolute values of differential values of said flattened reflectance curve in a visible light region of 380 nm–780 nm are equal to or less than 2.

9. A display apparatus as claimed in claim 4, wherein said laminated film has selective absorption with absorption peaks at approximately 450 nm, 570 nm, and 650 nm.

10. A display apparatus comprising:
a laminated film composed of at least three layers comprising a protective film, a conductive film, and an absorption film at a surface of a display plane,
wherein said laminated film is constituted so that a first layer in the order from an outer surface of said laminated film is said protective layer composed mainly of SiO$_2$, a second layer is said conductive layer composed of at least one metal selected from the group consisting of Ag, Pd, Pt, Cu, Cr, and Au, and a third layer is said absorption film containing coloring matter; and
wherein said laminated film has a luminous transmittance equal to or less than 85%, a luminous reflectance equal to or less than 2%, and a resistance equal to or less than 10000 Ω/□.

11. A display apparatus as claimed in claim 10, wherein said laminated film is provided on an outer surface of said display plane.

12. A display apparatus as claimed in claim 10, wherein said laminated film has a flattened reflectance curve, of which all absolute values of differential values in a visible light region of 380 nm–780 nm are equal to or less than 2.

13. A display apparatus as claimed in claim 10, wherein said laminated film has selective absorption with absorption peaks at approximately 450 nm, 570 nm, and 650 nm.

14. A display apparatus comprising:
a laminated film composed of at least three layers comprising a protective film, a conductive film, and an absorption film at a surface of a display plane,
wherein said laminated film is constituted so that a first layer in the order from an outer surface of said laminated film is said protective layer composed mainly of SiO$_2$, a second layer is said conductive layer composed of at least one metal selected from the group consisting of Ag, Pd, Pt, Cu, Cr, and Au, and a third layer is said absorption film containing coloring matter;
wherein said laminated film has an absorption equal to or less than 75% at approximately 450 nm, an absorption equal to or less than 65% at approximately 570 nm, an absorption equal to or less than 75% at approximately 650 nm, a luminous reflectance equal to or less than 1%, and a resistance equal to or less than 10000 Ω/□.

15. A Braun tube comprising:
a laminated film composed of at least three layers comprising a protective film, a conductive film, and an absorption film at a surface of a display plane, wherein said laminated film is constituted so that said absorption film contains coloring matter and is arranged at a position closer to said display plane than said conductive film; and
wherein said laminated film has a luminous transmittance equal to or less than 85%, a luminous reflectance equal to or less than 2%, a flattened reflectance curve, of which absolute values of differential values are equal to or less than 2, and a resistance equal to or less than 10000 Ω/□.

16. A Braun tube as claimed in claim 15, wherein said laminated film is provided on an outer surface of said display plane.

17. A Braun tube as claimed in claim 15, wherein said flattened reflectance curve of said laminated film has all of said absolute values of differential values in a visible light region of 380 nm–780 nm equal to or less than 2.

18. A Braun tube as claimed in claim 15, wherein said laminated film has selective absorption with absorption peaks at approximately 450 nm, 570 nm, and 650 nm.

19. A Braun tube comprising a film on a display plane, wherein said film has selective absorption and has:
a luminous transmittance equal to or less than 85%,
a luminous reflectance equal to or less than 2%, and
a flattened reflectance curve, of which all absolute values of differential values in a visible light region of 380 nm–780 nm are equal to or less than 2.

20. A Braun tube as claimed in claim 19, wherein said film is provided on an outer surface of said display plane.

21. A Braun tube as claimed in claim 19, wherein said film has said selective absorption peaks at approximately 450 nm, 570 nm, and 650 nm.

22. A display apparatus as claimed in any one of claims from 1, 2, 4–6, 10 and 14, wherein
said display apparatus is a plasma display device.

* * * * *